(12) United States Patent
Kim et al.

(10) Patent No.: US 12,319,771 B2
(45) Date of Patent: Jun. 3, 2025

(54) CATALYST COMPOSITION AND METHOD FOR PREPARING ISOBUTENE-ISOPRENE COPOLYMER USING THE SAME

(71) Applicant: LG Chem, Ltd., Seoul (KR)

(72) Inventors: Jeong Sik Kim, Daejeon (KR); Hee Jeong Kim, Daejeon (KR); Gyeong Shin Choi, Daejeon (KR); Won Hee Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 566 days.

(21) Appl. No.: 17/792,920

(22) PCT Filed: Sep. 7, 2021

(86) PCT No.: PCT/KR2021/012138
§ 371 (c)(1),
(2) Date: Jul. 14, 2022

(87) PCT Pub. No.: WO2022/059990
PCT Pub. Date: Mar. 24, 2022

(65) Prior Publication Data
US 2023/0099302 A1    Mar. 30, 2023

(30) Foreign Application Priority Data

Sep. 18, 2020 (KR) .................. 10-2020-0120298

(51) Int. Cl.
| C08F 4/54 | (2006.01) |
| C07F 5/02 | (2006.01) |
| C08F 4/52 | (2006.01) |
| C08F 210/12 | (2006.01) |
| C08F 236/08 | (2006.01) |

(52) U.S. Cl.
CPC .............. C08F 4/54 (2013.01); C07F 5/027 (2013.01); C08F 4/52 (2013.01); C08F 210/12 (2013.01); C08F 236/08 (2013.01)

(58) Field of Classification Search
None
See application file for complete search history.

(56) References Cited

U.S. PATENT DOCUMENTS

| 4,107,417 A | 8/1978 | Priola et al. |
| 2001/0027161 A1 | 10/2001 | LaPointe |
| 2002/0032120 A1* | 3/2002 | Babb .................. C07F 5/027 |
| | | 502/103 |
| 2002/0132729 A1 | 9/2002 | LaPointe |
| 2003/0176606 A1 | 9/2003 | Bohnenpoll et al. |
| 2004/0077491 A1 | 4/2004 | Babb et al. |
| 2005/0009688 A1 | 1/2005 | Babb et al. |
| 2005/0101751 A1 | 5/2005 | Shaffer et al. |
| 2005/0107536 A1 | 5/2005 | Shaffer et al. |
| 2006/0089467 A1 | 4/2006 | McDonald et al. |
| 2006/0094847 A1 | 5/2006 | Milner et al. |
| 2006/0100409 A1 | 5/2006 | Shaffer et al. |
| 2006/0111522 A1 | 5/2006 | McDonald et al. |
| 2006/0173227 A1 | 8/2006 | Bohnenpoll et al. |
| 2008/0221285 A1 | 9/2008 | Walter et al. |
| 2008/0249264 A1 | 10/2008 | Hanefeld et al. |
| 2008/0249267 A1 | 10/2008 | Hanefeld et al. |
| 2013/0178679 A1 | 7/2013 | Wettling et al. |
| 2016/0145362 A1 | 5/2016 | Wettling et al. |
| 2019/0284313 A1 | 9/2019 | Corberan Roc et al. |
| 2020/0354489 A1 | 11/2020 | Jo et al. |

FOREIGN PATENT DOCUMENTS

| CA | 2789843 A1 | 8/2011 |
| CN | 101282785 A | 10/2008 |
| CN | 101331159 A | 12/2008 |
| CN | 105377910 A | 3/2016 |
| CN | 111587258 A | 8/2020 |
| JP | 2003277428 A | 10/2003 |
| JP | 2011080084 A | 4/2011 |
| JP | 2016525165 A | 8/2016 |
| JP | 2019524937 A | 9/2019 |
| KR | 20000075063 A | 12/2000 |
| KR | 20010041126 A | 5/2001 |
| KR | 20080068107 A | 7/2008 |
| KR | 20080070057 A | 7/2008 |
| KR | 20130008551 A | 1/2013 |
| KR | 20160033736 A | 3/2016 |
| KR | 20190032381 A | 3/2019 |
| WO | 0208303 A1 | 1/2002 |
| WO | 2007020247 A2 | 2/2007 |

OTHER PUBLICATIONS

Dominik Vagedes et al., Synthesis and structural characterization of [H(OEt2)2]+[(C3H3N2){B(C6F5)3}2]—a Brønsted acid with an imidazole-derived 'non-coordinating' anion, Journal of Organometallic Chemistry, Jan. 2002, vol. 641, Nos. 1-2, pp. 148-155.

(Continued)

Primary Examiner — Catherine S Branch
(74) Attorney, Agent, or Firm — Lerner David LLP

(57) ABSTRACT

The present invention relates to a catalyst composition including an imidazolinium ion-based catalyst and an aluminum-based cocatalyst, and a method for preparing an isobutene-isoprene copolymer using the same.

13 Claims, No Drawings

CATALYST COMPOSITION AND METHOD FOR PREPARING ISOBUTENE-ISOPRENE COPOLYMER USING THE SAME

CROSS-REFERENCE TO RELATED APPLICATIONS

The present application is a national stage entry under 35 U.S.C. § 371 of International Application No. PCT/KR2021/012138 filed on Sep. 7, 2021, which claims priority from Korean Patent Application No. 10-2020-0120298 filed on Sep. 18, 2020, all the disclosures of which are incorporated herein by reference.

TECHNICAL FIELD

The present invention relates to a catalyst composition including an imidazolinium ion-based catalyst and an aluminum-based cocatalyst, and a method for preparing an isobutene-isoprene copolymer using the same.

BACKGROUND ART

Butyl rubber (isobutene-isoprene rubber, IIR) is an isobutene-isoprene copolymer containing isobutene and about 1 to 6% of isoprene, and has excellent chemical resistance, humidity resistance, electrical insulation, or the like, and thus, is used as an adhesive composition, adhesive sheet, or the like. In addition, butyl rubber undergoes additional halogenation reaction into the double bonds of isoprene for crosslinking/compounding with other rubber, and then being used, and is characterized in not showing gas permeability, and accordingly, is widely used in the inner tube and inner liner of tires.

As a synthetic method used for polymerizing butyl rubber, cationic polymerization is typical, and as a catalyst, a Lewis acid catalyst such as $BF_3$ and $AlCl_3$ is generally used. The Lewis acid catalyst is weak to moisture, and if reacted with water, a strong acid such as HCl and HF may be produced, and this may be mixed in a product to arise defects of deteriorating product quality. In addition, due to the strong corrosiveness of the Lewis acid catalyst, high investment setting is required for designing a process considering corrosion resistance.

Cationic polymerization is mostly performed at a low temperature, and according to the molecular weight of butyl rubber to be prepared, there are difficulties of careful control of a polymerization temperature around $-100°$ C. Particularly, to increase the molecular weight of a butyl rubber product having a medium molecular weight or more, the polymerization is performed after reducing the reaction temperature to an extremely low temperature of $-100°$ C. In order to control the temperature, an expensive ethylene refrigerator is required to install and use. To secure safety, a number of refrigerators are designed in double or triple, and there are defects of increasing investment costing.

In addition, in order to sufficiently increase reactivity, a toxic solvent such as methyl chloride ($CH_3Cl$), dichloromethane ($CH_2Cl_2$) and ethyl chloride ($CH_3CH_2Cl$), which are halogen-containing solvents, is used, and this is taken as a disadvantage.

Further, in a quenching work after using the Lewis acid catalyst, a large amount of organic base such as NaOH, KOH, $NaNH_4$, and $KNH_4$ is used, and such an organic base reacts with a Lewis acid to form a highly toxic waste material such as $Na(BF_3OH)$, $Na(AlCl_3OH)$, $K(BF_3OH)$, and $K(AlCl_3OH)$, and if the waste material is washed, a large amount of waste water is generated.

The conventional method for preparing butyl rubber as described above has defects of various aspects, and the development of a method for efficiently preparing butyl rubber using a harmless method to environments is still required.

PRIOR ART DOCUMENT

Patent Document

US Laid-open Patent No. 2013-0178679

DISCLOSURE OF THE INVENTION

Technical Problem

An object of the present invention is to provide a catalyst composition which may prepare an isobutene-isoprene copolymer with a high polymerization conversion ratio, while controlling a number average molecular weight.

Another object of the present invention is to provide a method for preparing an isobutene-isoprene copolymer using the catalyst composition.

Technical Solution

In order to solve the above-described tasks, the present invention provides a catalyst composition including a catalyst represented by Formula 1 below and a cocatalyst represented by Formula 2 below.

[Formula 1]

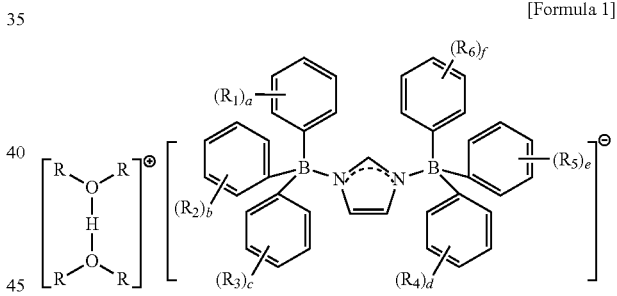

In Formula 1,
R is an alkyl group of 2 to 12 carbon atoms,
$R_1$ to $R_6$ are each independently a halogen group, and
a to f are each independently an integer of 1 to 5,

[Formula 2]

$(R_a)_n Al(X)_{3-n}$ in Formula 2,
$R_a$ is a hydrocarbon group of 1 to 20 carbon atoms,
X is a halogen group, and
n is an integer of 0 to 3.

In addition, the present invention provides a method for preparing an isobutene-isoprene copolymer, including copolymerizing isobutene and isoprene in the presence of the catalyst composition.

Advantageous Effects

The catalyst composition of the present invention is a combination of an imidazolinium ion-based catalyst having excellent catalyst activity and an aluminum-based cocatalyst. In case of preparing an isobutene-isoprene copolymer using the same, an isobutene-isoprene copolymer may be prepared in a high polymerization conversion ratio, the economic feasibility and efficiency of a preparation process may be improved, and a copolymer having a high molecular weight and narrow molecular weight distribution may be prepared.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

<Catalyst Composition>

The catalyst composition of the present invention is characterized in including a catalyst represented by Formula 1 below and a cocatalyst represented by Formula 2 below.

[Formula 1]

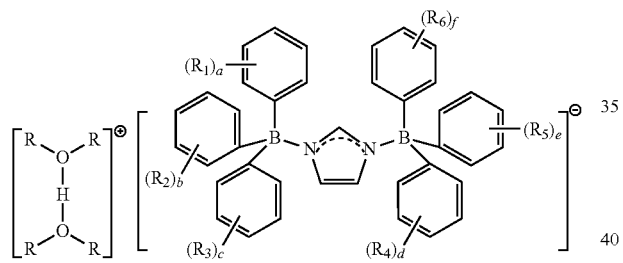

In Formula 1,

R is an alkyl group of 2 to 12 carbon atoms, $R_1$ to $R_6$ are each independently a halogen group, and a to f are each independently an integer of 1 to 5,

[Formula 2]

$(R_a)_n Al(X)_{3-n}$ in Formula 2, $R_a$ is a hydrocarbon group of 1 to 20 carbon atoms, X is a halogen group, and n is an integer of 0 to 3.

The "alkyl group" may mean monovalent aliphatic saturated hydrocarbon and may include both a linear alkyl group such as methyl, ethyl, propyl and butyl and a branched alkyl group such as isopropyl, sec-butyl, tert-butyl and neopentyl. Particularly, a methyl group, an ethyl group, a propyl group, an isopropyl group, a butyl group, an isobutyl group, a tert-butyl group, a sec-butyl group, a 1-methyl-butyl group, a 1-ethyl-butyl group, a pentyl group, an isopentyl group, a neopentyl group, a tert-pentyl group, a 1-methylpentyl group, a 2-methylpentyl group, a 4-methyl-2-pentyl group, a hexyl group, an isohexyl group, a 4-methylhexyl group, a 5-methylhexyl group, a heptyl group, or the like, may be used, without limitation.

Particularly, R may be an alkyl group of 2 to 12 carbon atoms, an alkyl group of 2 to 8 carbon atoms, an alkyl group of 2 to 6 carbon atoms, an alkyl group of 2 to 4 carbon atoms, or an ethyl group, $R_1$ to $R_4$ may be each independently a halogen group, particularly, F or Cl, for example, F, a to f may be each independently an integer of 1 to 5, an integer of 3 to 5, or an integer of 4 or 5. Most preferably, $R_1$ to $R_4$ may be a fluoro group, and a to f may be 5.

More particularly, the catalyst represented by Formula 1 may be represented by Formula 1-1 or Formula 1-2 below, without limitation.

[Formula 1-1]

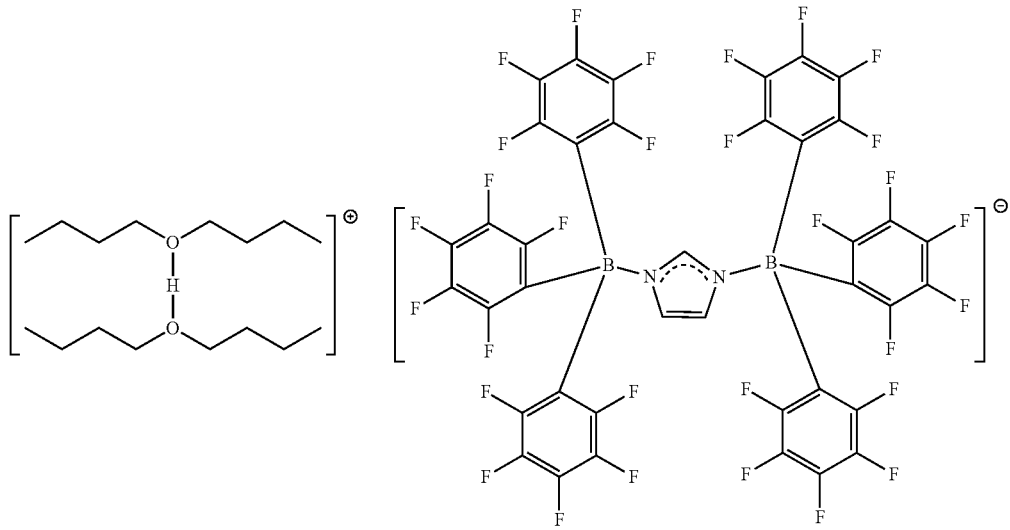

[Formula 1-2]

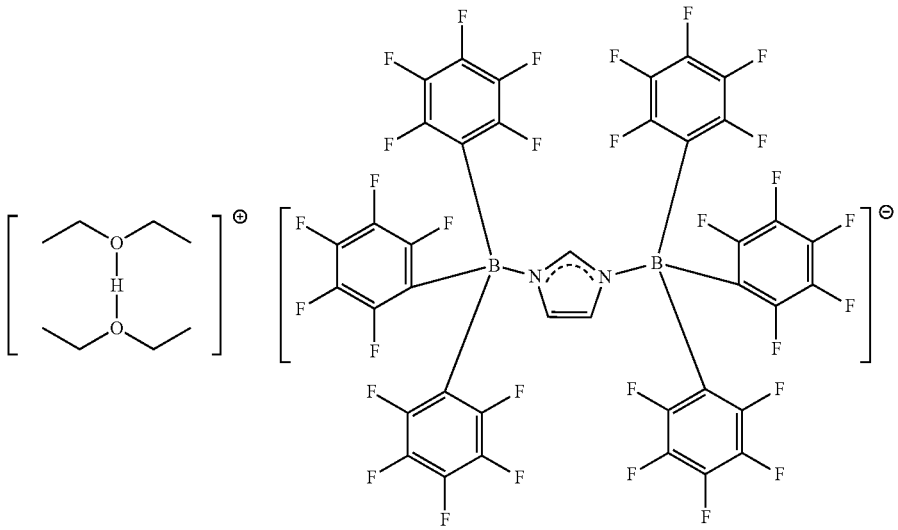

The catalyst of the present invention includes an organic borate containing one or more halogen substituents having strong electron withdrawing phenomenon in a phenyl group, as an anionic moiety, and a C—B bond is strong. Accordingly, though mixed with the aluminum-based cocatalyst of the present invention, the C—B bond is kept, and catalyst activity is not lost, and thus, the catalyst is used for cationic polymerization to show excellent efficiency.

In addition, in the anionic moiety, two groups of boron (B) to which three phenyl groups are bonded are included, and the structure is characterized in positioning imidazolinium at a bridge connecting two boron atoms. Since two groups of B to which three phenyl groups are bonded are included, the structure is sterically bulky, and the imidazolinium bridge connecting two B has a bent structure and does not form a plane. Accordingly, in a three-dimensional view, even further parts may be covered, and an even further bulky structure may be achieved. Likewise, the bulky structure in the anionic moiety in the catalyst stabilizes the terminal cations of chains which undergo polymerization during the cationic polymerization of isobutene and isoprene to improve stability, and allows continuous bonding of monomers for polymerization without finishing the cationic polymerization. An isobutene-isoprene copolymer prepared through such a process may accomplish a high molecular weight.

On the contrary, in the case where only one group of B is included, the size of the anionic moiety is relatively small, and if bonded to the cation at the terminal of a polymer chain, a relatively unstable state is obtained than a case of using the catalyst represented by Formula 1. In this case, due to the instability of the terminal cations at the chains, the cationic polymerization is terminated early, or chain transfer is generated to arise defects of producing only a copolymer having a low molecular weight.

In addition, though two groups of B are included, if imidazolinium is not positioned at the bridge connecting them, but a bridge having a straight and planar shape such as nitrile and azide is positioned, the anionic moiety may become relatively less steric, the terminal cations of chains may become unstable, and reactivity may be markedly deteriorated.

The catalyst composition of the present invention includes a cocatalyst represented by Formula 2 together with the catalyst represented by Formula 1. Here, the cocatalyst represented by Formula 2 may refer to, for example, a trialkyl aluminum compound, a dialkyl aluminum halide compound, an alkyl aluminum dihalide compound, an aluminum trihalide compound, or the like.

[Formula 2]

$(R_a)_n Al(X)_{3-n}$

In Formula 2,
$R_a$ is a hydrocarbon group of 1 to 20 carbon atoms,
X is a halogen group, and
n is an integer of 0 to 3.
$R_a$ may be an alkyl group of 1 to 12 carbon atoms, a cycloalkyl group of 3 to 12 carbon atoms or an aryl group of 6 to 12 carbon atoms, preferably, an alkyl group of 1 to 12 carbon atoms, an alkyl group of 1 to 6 carbon atoms, an alkyl group of 1 to 3 carbon atoms, or an ethyl group. X may preferably be Cl or Br, preferably, Cl, and n may be an integer of 1 to 3, or an integer of 2 or 3.

The cocatalyst represented by Formula 2 may use trialkyl aluminum such as trimethyl aluminum, triethyl aluminum, tri-n-propyl aluminum, triisopropyl aluminum, tri-n-butyl aluminum, triisobutyl aluminum, tri-t-butyl aluminum, tripentyl aluminum, trihexyl aluminum, tricyclohexyl aluminum, trioctyl aluminum, and tri-2-ethylhexyl aluminum; dialkyl aluminum halide such as dimethyl aluminum chloride, diethyl aluminum chloride, diisopropyl aluminum chloride, diisobutyl aluminum chloride, and dimethyl aluminum bromide; alkyl aluminum dihalide such as methyl aluminum dichloride, ethyl aluminum dichloride, isopropyl aluminum dichloride, and ethyl aluminum dibromide; aluminum trihalide such as aluminum trihalide; or combinations thereof, without limitation.

The catalyst composition of the present invention is suitable to use for the cationic polymerization reaction for preparing an isobutene-isoprene copolymer. During cationic polymerization, it is important to stabilize a cationic moiety formed during polymerization reaction, and the cocatalyst represented by Formula 2 is a strong Lewis acid and may form an ion pair with a borate-based bulky anion in a catalyst structure, and through this, plays the role of effectively stabilizing the cationic moiety. Accordingly, an isobutene-isoprene copolymer having a high molecular weight may be prepared.

Particularly, during copolymerizing isobutene and isoprene, different from the homopolymerization of isobutene, isoprene may be bonded to a cationic chain undergoing polymerization to achieve a resonance structure to deteriorate the additional reaction of cations, and it would be apprehended that the additional polymerization is performed very slowly, or termination reaction may arise. Considering these points, it is important to select and use a catalyst and a cocatalyst, having high reactivity so that early termination may not arise.

As in the present invention, if the catalyst represented by Formula 1 and the cocatalyst represented by Formula 2 are used in combination in polymerization reaction, alkyl bonded to aluminum in the cocatalyst represented by Formula 2 reacts with hydrogen of the catalyst represented by Formula 1 to be dissociated into an alkane. After that, an empty site in the cocatalyst represented by Formula 2 allows strongly bonding of the ether of the catalyst represented by Formula 1 and another molecule of the cocatalyst represented by Formula 2 to form aluminum cations having strong Lewis acid properties, and this may effectively act as the polymerization initiator of the copolymerization reaction of isobutene and isoprene. For example, if $Et_2AlCl$ is used as the cocatalyst represented by Formula 2 in the present invention, an aluminum cation such as $[Al(Et)Cl]^+$ and $[AlCl]^{2+}$ are formed, and these may act as polymerization catalysts.

On the contrary, other types of cocatalysts not including aluminum may not arise the above-described reaction, and particularly, metal compounds including an element such as magnesium (Mg), zinc (Zn), and iron (Fe), as a metal other than aluminum, aluminum oxide such as aluminoxane, or the like have low reactivity, and the formation of a metal cation by the reaction with the catalyst is difficult, and it is unsuitable to use as a cocatalyst of cationic polymerization reaction. In addition, though including aluminum, if a cocatalyst does not have a structure easily initiating cationic polymerization through a mechanism of dissociating partial functional groups into an alkane, it is difficult to use the cocatalyst together with the catalyst represented by Formula 1.

As described above, the present invention is characterized in using the catalyst represented by Formula 1 and the cocatalyst represented by Formula 2 as a suitable combination which may efficiently prepare an isobutene-isoprene copolymer by performing cationic polymerization in a high conversion ratio.

The weight ratio of the catalyst represented by Formula 1 and the cocatalyst represented by Formula 2 may be 1:2 to 1:16, particularly, 1:4 to 1:12, or 1:8 in respect of increasing a production yield, while easily controlling the weight average molecular weight of an isobutene-isoprene copolymer to a suitable value in a desired range.

If the weight of the cocatalyst represented by Formula 2 deviates from the above range and is too small, catalyst activation through the cocatalyst may insufficiently arise, and defects of inefficiently performing cationic polymerization may arise, and if the weight of the catalyst represented by Formula 1 deviates from the above range and is too small, polymerization reaction using the catalyst may insufficiently arise, and defects of deteriorating polymerization efficiency in contrast to the cocatalyst used may arise.

<Preparation Method of Isobutene-Isoprene Copolymer>

The method for preparing an isobutene-isoprene copolymer of the present invention is characterized in including copolymerizing isobutene and isoprene in the presence of the catalyst composition.

The copolymerization of isobutene and isoprene may be performed at a temperature of −50 to −10° C., and may particularly be performed at a temperature of −40 to −20° C., considering the efficient preparation of the isobutene-isoprene copolymer having a high molecular weight, that is the purpose of the present invention. In addition, the polymerization reaction at the temperature may be performed for 30 minutes to 5 hours, or 1 hour to 3 hours.

If the polymerization temperature is higher than −10° C., chain propagation may arise rapidly at a relatively high temperature, and a conversion ratio may increase, but a molecular weight becomes low. Accordingly, defects of not forming an isobutene-isoprene copolymer having a high molecular weight as in the present invention, may arise. If the polymerization temperature is lower than −50° C., catalyst activity may be reduced due to a low temperature, a greater amount of the catalyst is required for performing the same polymerization reaction, and defects of largely degrading economic feasibility and efficiency of a polymerization process may arise.

In the present invention, the amount of the catalyst represented by Formula 1 may be 0.002 to 0.05 wt %, particularly, 0.002 wt % or more, 0.005 wt % or more, 0.010 wt % or more, and 0.050 wt % or less, 0.040 wt % or less, 0.030 wt % or less, based on the total weight of the isobutene and the isoprene. If the above-described range is satisfied, the polymerization reaction may be efficiently performed, and if the catalyst is used in an excessive amount than the above numerical range, the polymerization efficiency may not be significantly improved in contrast to the increase of the cost of raw materials.

In addition, the amount of the cocatalyst may be 0.05 to 0.4 wt %, particularly, 0.05 wt % or more, 0.10 wt % or more, 0.15 wt % or more, and 0.40 wt % or less, 0.30 wt % or less, 0.20 wt % or less, based on the total weight of the isobutene and the isoprene. If the cocatalyst is used in the above range, suitable effects of using the cocatalyst may be achieved, and the isobutene-isoprene copolymer may be prepared in excellent efficiency. If an excessive amount is added, the increase of process costs according to the increase of the amount of residual byproducts in a final copolymer may arise, and it is preferable to control and use a suitable amount of the cocatalyst in the above range.

The amount of the isoprene may be suitably selected in a range satisfying desired physical properties, and may particularly be 1 mol % or more, 1.5 mol % or more, and 10 mol % or less, 8 wt % or less, 5 mol % or less, 3 mol % or less, 2.5 mol % or less, based on the isobutene.

The molecular weight distribution of the isobutene-isoprene copolymer prepared through the preparation method of the present invention may be 1.5 to 3.0, particularly, 2.9 or less, 2.8 or less, 2.5 or less, 2.4 or less.

The physical properties of the copolymer in the above range may be controlled diversely through the preparation method of the present invention, and particularly, through controlling the type or amount of the cocatalyst, the molecular weight and molecular weight distribution may be easily controlled according to desired purposes.

The weight average molecular weight and the number average molecular weight are polystyrene conversion molecular weights analyzed by gel permeation chromatography (GPC), and the molecular weight distribution is calculated from the ratio of (weight average molecular weight)/(number average molecular weight).

The catalyst composition of the present invention is suitable for preparing an isobutene-isoprene copolymer having the molecular weight and molecular weight distribution values, and easily controls initiation reaction and chain propagation reaction using the catalyst represented by Formula 1 and the cocatalyst represented by Formula 2 so as to prepare an isobutene-isoprene copolymer having a high weight average molecular weight and low molecular weight distribution in the above ranges.

Accordingly, in order to prepare an isobutene-isoprene copolymer having a desired high weight average molecular weight, the polymerization temperature may be set to −50 to −10° C., but the polymerization temperature is not limited thereto. A person having ordinary skill in the art could suitably control the reaction temperature considering the molecular weight, molecular weight distribution of the isobutene-isoprene copolymer prepared, or the like.

In addition, in the present invention, the catalyst composition may include a halogen-free solvent. That is, the copolymerization may be performed under a halogen-free solvent. Particularly, the catalyst composition of the present invention includes a hydrocarbon solvent together with the catalyst and the cocatalyst, and the hydrocarbon solvent may use a mixture of a halogenated hydrocarbon solvent and a halogen-free solvent, or a halogen-free solvent solely.

The halogen-free solvent may be an aliphatic hydrocarbon solvent or an aromatic hydrocarbon solvent. For example, the aliphatic hydrocarbon solvent may be one or more selected from the group consisting of butane, pentane, neopentane, hexane, cyclohexane, methylcyclohexane, heptane and octane, and the aromatic hydrocarbon solvent may be one or more selected from the group consisting of benzene, toluene, xylene and ethylbenzene, without limitation.

The halogenated hydrocarbon solvent may be one or more selected from the group consisting of chloromethane, dichloromethane, trichloromethane, 1-chlorobutane and chlorobenzene, without limitation.

In the present invention, if the halogen-free solvent and the halogenated hydrocarbon solvent are mixed and used as the solvent, a mixing ratio may be 100:1 to 1:2 in a volume ratio, particularly, 100:1 to 1:1 in a volume ratio, without limitation.

The method for preparing an isobutene-isoprene copolymer of the present invention may further perform a step of removing a catalyst after the step of performing the cationic polymerization of the monomer. Since the catalyst of the present invention may be efficiently removed through a step of simple physical filtering, the use and removal is more advantageous when compared to the Lewis acid catalyst of the conventional technique.

Particularly, after polymerizing the isobutene-isoprene copolymer, an organic solvent may be removed so as to control the organic solvent to 40 wt % or less, 20 wt % or less, or 5 wt % or less of an oligomer or a polymer. Then, in case of a polymer having liquidity, a step of filtering insoluble materials using a glass filter with 80 mesh or more, 100 mesh or more, or 200 mesh or more may be performed. Otherwise, the catalyst may be removed by passing a polymer having liquidity through a silica, celite or zeolite filter.

Meanwhile, in case of a polymer having little liquidity, liquidity is provided using one or more selected from the group consisting of a linear alkyl solvent, for example, pentane, cyclopentane, hexane, cyclohexane, heptane, and octane, and an ether solvent, for example, diethyl ether and petroleum ether, and then, a step of filtering through the glass filter, or the silica, celite or zeolite filter may be performed.

Generally, the isobutene-isoprene copolymer thus produced is dissolved in an organic solvent such as pentane, cyclopentane, hexane, cyclohexane, heptane, octane, diethyl ether and petroleum ether, and washed to remove a catalyst. However, in the present invention, the catalyst represented by Formula 1 may be efficiently removed through the simple filtering step as described above, and a separate washing step is not required.

In addition, the preparation method of the present invention may further include a step of drying residual solvents after the filtering step. For example, the drying temperature may be 30 to 200° C., or 40 to 150° C., and a vacuum degree may be 300 torr or less, 200 torr or less, or 100 torr or less. As a result, a desired isobutene-isoprene copolymer may be efficiently obtained. In addition, a drying method is not specifically limited, and a common method may be applied.

In addition, in the method for preparing an isobutene-isoprene copolymer of the present invention, a step of drying a halogenated hydrocarbon solvent may be separately performed or not, after the polymerization step and before the filtering. If the drying step is performed, drying conditions may be the same as described above, without specific limitation.

In the case of separately performing the drying step of the halogenated hydrocarbon solvent, there are advantages in that an isobutene-isoprene copolymer may be obtained in a higher purity. However, according to the present invention, since the catalyst may be easily removed through the simple filtering as described above, the separate dying step of the halogenated hydrocarbon solvent after the step of polymerization and before the filtering, may be omitted, and there are advantages of simplifying a process.

EXAMPLES

Hereinafter, the present invention will be explained in more detail by embodiments. However, the embodiments below are only illustrations of the present invention, and the scope of the present invention is not limited thereto.

<Preparation of Catalysts>

Preparation Example 1

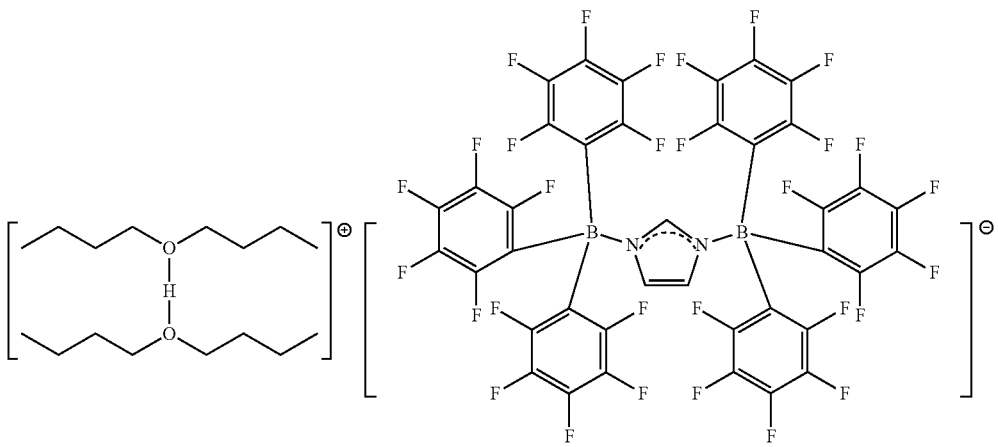

In the presence of DCM, sodium imidazole and 2 equivalents of $B(C_6F_5)_3$ in contrast to the sodium imidazole were mixed and stirred at room temperature for 15 hours to prepare $[Na]^+[Imd(B(C_6F_5)_3)_2]^-$. A HCl solution in diethyl ether was injected thereto in a low temperature state, the temperature was raised to room temperature, and stirring was performed for 1 hour. Diethyl ether was removed in vacuum, and a NaCl salt byproduct was removed by filtering.

To the material thus obtained and DCM, 3 equivalents of dibutyl ether was added and stirred at room temperature for 30 minutes, and the solvent and dibutyl ether were dried in vacuum to obtain the catalyst of Preparation Example 1.

Preparation Example 2

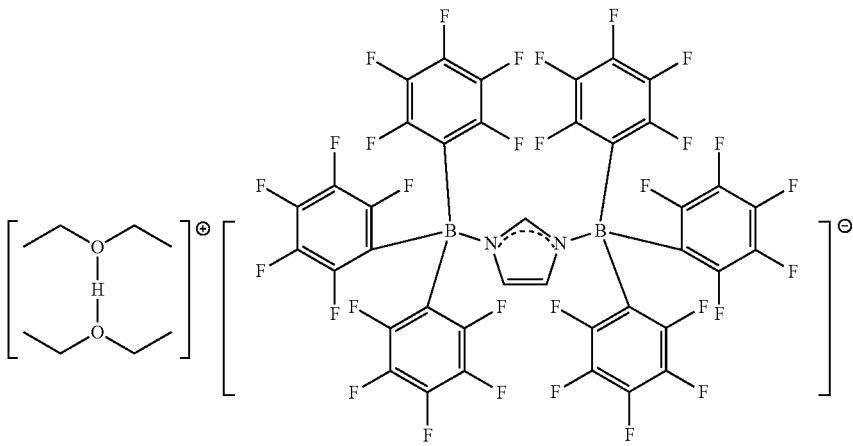

In the presence of DCM, sodium imidazole and 2 equivalents of $B(C_6F_5)_3$ in contrast to the sodium imidazole were mixed and stirred at room temperature for 15 hours to prepare $[Na]^+[Imd(B(C_6F_5)_3)_2]^-$. A HCl solution in diethyl ether was injected thereto in a low temperature state, the temperature was raised to room temperature, and stirring was performed for 1 hour. Diethyl ether was removed in vacuum, and a NaCl salt byproduct was removed by filtering to obtain the catalyst of Preparation Example 2.

Comparative Preparation Example 1

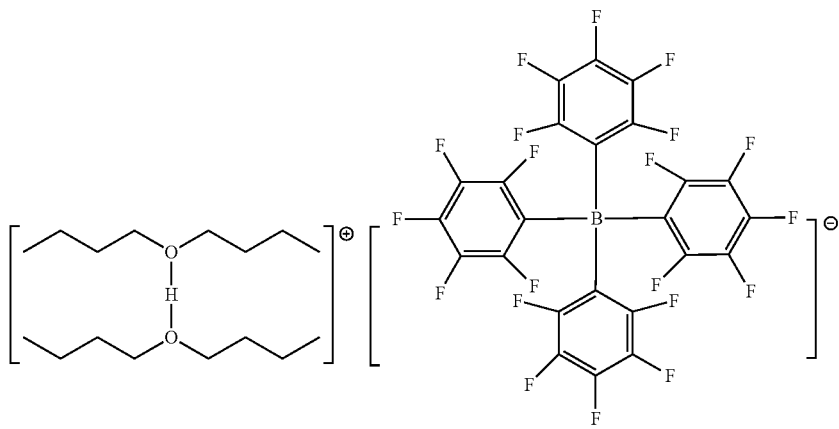

In the presence of DCM, a HCl solution in diethyl ether was injected to LiB($C_6H_5$)$_4$ in a low temperature state, the temperature was raised to room temperature, and stirring was performed for 1 hour. Diethyl ether was removed in vacuum, and a NaCl salt byproduct was removed by filtering.

To the material thus obtained and DCM, 3 equivalents of dibutyl ether was added and stirred at room temperature for 30 minutes, and the solvent and dibutyl ether were dried in vacuum to obtain the catalyst of Comparative Preparation Example 1.

Comparative Preparation Example 2

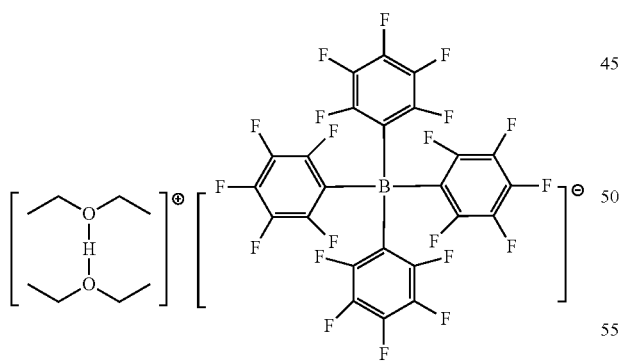

In the presence of DCM, a HCl solution in diethyl ether was injected to LiB($C_6H_5$)$_4$ in a low temperature state, the temperature was raised to room temperature, and stirring was performed for 1 hour. Diethyl ether was removed in vacuum, and a NaCl salt byproduct was removed by filtering to obtain the catalyst of Comparative Preparation Example 2.

Comparative Preparation Example 3

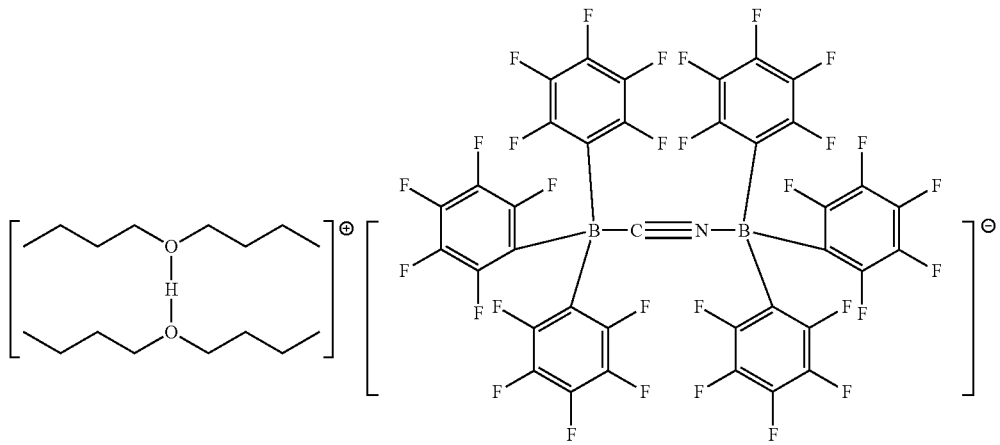

In the presence of DCM, NaCN and 2 equivalents of B($C_6F_5$)$_3$ in contrast to NaCN were mixed and stirred at room temperature for 15 hours to prepare [Na]$^+$[CN(B($C_6F_5$)$_3$)$_2$]$^-$. A HCl solution in diethyl ether was injected in a low temperature state, the temperature was raised to room temperature, and stirring was performed for 1 hour. Diethyl ether was removed in vacuum, and a NaCl salt byproduct was removed by filtering.

To the material thus obtained and DCM, 3 equivalents of dibutyl ether was added and stirred at room temperature for 30 minutes, and the solvent and dibutyl ether were dried in vacuum to obtain the catalyst of Comparative Preparation Example 3.

Comparative Preparation Example 4

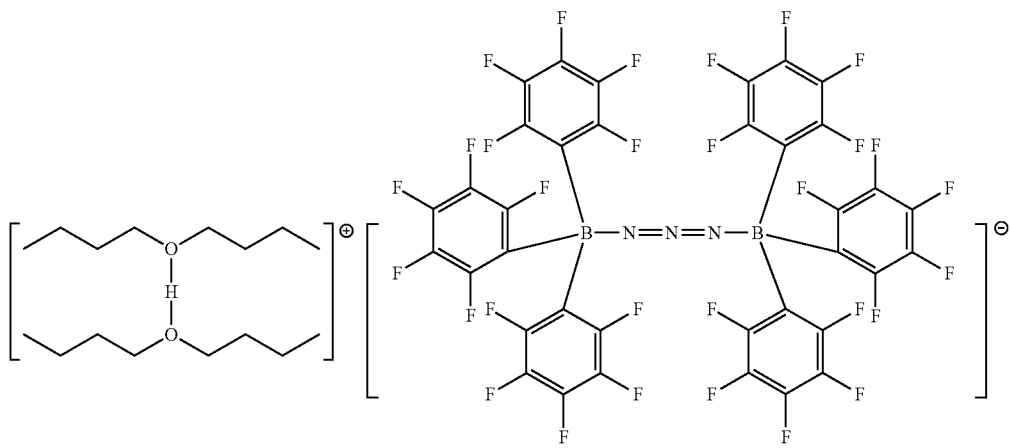

In the presence of DCM, NaN$_3$ and 2 equivalents of B($C_6F_5$)$_3$ in contrast to NaN$_3$ were mixed and stirred at room temperature for 15 hours to prepare [Na]$^+$[N$_3$(B($C_6F_5$)$_3$)$_2$]$^-$. A HCl solution in diethyl ether was injected in a low temperature state, the temperature was raised to room temperature, and stirring was performed for 1 hour. Diethyl ether was removed in vacuum, and a NaCl salt byproduct was removed by filtering.

To the material thus obtained and DCM, 3 equivalents of dibutyl ether was added and stirred at room temperature for 30 minutes, and the solvent and dibutyl ether were dried in vacuum to obtain the catalyst of Comparative Preparation Example 4.

Comparative Preparation Example 5

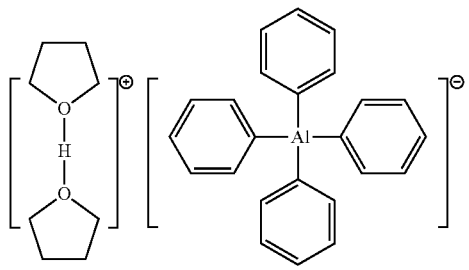

In a glove box, 100 mg of LiAlH$_4$ was dissolved in 5 mL of THF, 4 equivalents of pentafluorophenyl was slowly injected thereto, and a cock was opened for the sufficient generation of H$_2$. After stirring at room temperature for 1 hour, the cock was closed, a reaction system was taken out of the glove box, and 3 equivalents of HCl in diethyl ether was slowly injected thereto. After stirring for 1 hour, the solvent was removed in vacuum, and the reaction system was put in the glove box. After dissolving the product in DCM, LiCl was removed using a syringe filter, the solvent was removed in vacuum, and the remaining product was washed with anhydrous hexane. Then, the product thus obtained was dried in vacuum to obtain the catalyst of Comparative Preparation Example 5 in a white solid state.

<Preparation of Isobutene-Isoprene Copolymer>

Example 1

An Andrew glass pressure reactor from which moisture and oxygen were removed was prepared. 20 g of isobutene was injected through a line connecting an isobutene bombe and the Andrew glass which was cooled to −40° C. As a solvent, hexane passed through a moisture purification column was used, and after calculating the monomer concentration in the reactants (total solution for compound, TSC), an amount suitable for corresponding TSC was separately taken using a syringe and injected through the top of the Andrew glass.

An isoprene co-monomer was used after being passed through an alumina column in a glove box. Isoprene was weighed using a syringe in 1.65 mol % based on the isobutene, and injected through the top of the Andrew glass. As a catalyst, 0.025 wt % of the catalyst of Preparation Example 1, stored in a glove box at a low temperature was weighed based on the total weight of the isobutene and the isoprene, and dissolved in a dichloromethane (DCM) solvent. A cocatalyst, (Et)$_2$AlCl was also stored in the glove box, and the cocatalyst was diluted in hexane into 25 wt %, and 0.200 wt % was weighed based on the total weight of the isobutene and isoprene and mixed with a catalyst solution.

The mixed catalyst+cocatalyst solution was transported to a syringe, transported to out of the glove box, and then, injected through the top of the Andrew glass. After injecting the catalyst, the reaction was performed at −40° C. for 60 minutes. After finishing the reaction, the valve of the top of the Andrew glass was opened to remove remaining unreacted isobutene, and then, the Andrew glass was opened to recover butyl rubber and solvents. The recovered butyl rubber was dried in an oven of 110° C. for 2 hours to remove remaining solvents, and the analysis thereof was conducted.

Examples 2 to 5, and Comparative Examples 1 to 12

Isobutene-isoprene copolymers were prepared by the same method as in Example 1 except for changing polymerization conditions as shown in Table 1 below.

TABLE 1

| | Catalyst type | Catalyst amount (wt %) | Cocatalyst | Cocatalyst amount (wt %) | Isoprene (mol %) | Temp (° C.) | Time (min) |
|---|---|---|---|---|---|---|---|
| Example 1 | Preparation Example 1 | 0.025 | (Et)$_2$AlCl | 0.200 | 1.65 | −40 | 60 |
| Example 2 | Preparation Example 1 | 0.025 | (Et)$_2$AlCl | 0.300 | 1.65 | −40 | 60 |
| Example 3 | Preparation Example 1 | 0.025 | (Et)$_2$AlCl | 0.200 | 1.65 | −40 | 180 |
| Example 4 | Preparation Example 1 | 0.025 | (Et)$_2$AlCl | 0.200 | 2.00 | −40 | 60 |
| Example 5 | Preparation Example 2 | 0.025 | (Et)$_2$AlCl | 0.200 | 1.65 | −40 | 60 |
| Comparative Example 1 | Comparative Preparation Example 1 | 0.025 | (Et)$_2$AlCl | 0.200 | 1.65 | −40 | 60 |
| Comparative Example 2 | Comparative Preparation Example 2 | 0.025 | (Et)$_2$AlCl | 0.200 | 1.65 | −40 | 60 |
| Comparative Example 3 | Comparative Preparation Example 3 | 0.025 | (Et)$_2$AlCl | 0.200 | 1.65 | −40 | 60 |
| Comparative Example 4 | Comparative Preparation Example 4 | 0.025 | (Et)$_2$AlCl | 0.200 | 1.65 | −40 | 60 |
| Comparative Example 5 | Comparative Preparation Example 5 | 0.025 | (Et)$_2$AlCl | 0.200 | 1.65 | −40 | 60 |
| Comparative Example 6 | Preparation Example 1 | 0.025 | — | — | 1.65 | −40 | 60 |
| Comparative Example 7 | Preparation Example 2 | 0.025 | — | — | 1.65 | −40 | 60 |
| Comparative Example 8 | Preparation Example 1 | 0.025 | Al(SiEt$_3$)$_3$ | 0.200 | 1.65 | −40 | 60 |

TABLE 1-continued

| | Catalyst type | Catalyst amount (wt %) | Cocatalyst | Cocatalyst amount (wt %) | Isoprene (mol %) | Temp (° C.) | Time (min) |
|---|---|---|---|---|---|---|---|
| Comparative Example 9 | Preparation Example 1 | 0.025 | Ethylaluminum sesquichloride | 0.100 | 1.65 | −40 | 60 |
| Comparative Example 10 | Preparation Example 1 | 0.025 | Ethylaluminum sesquichloride | 0.025 | 1.65 | −40 | 60 |
| Comparative Example 11 | Preparation Example 1 | 0.025 | DIBAL-H | 0.200 | 1.65 | −40 | 60 |
| Comparative Example 12 | Preparation Example 1 | 0.025 | $Mg(ClO_4)_2$ | 0.100 | 1.65 | −40 | 60 |

<Analysis of Physical Properties of Isobutene-Isoprene Copolymers>

Experimental Example 1

With respect to the isobutene-isoprene copolymers prepared in the Examples and Comparative Examples, physical properties were measured by the methods below, and the results are summarized in Table 2.

(1) Yield (%)

Calculation was conducted through dividing the weight (g) of the isobutene-isoprene copolymer obtained by the sum of the weight (g) of the isobutene and the weight (g) of the isoprene.

(2) Isoprene Content (Mol %)

$^1$H NMR was measured using 500 MHz NMR (Agilent Co.) (specimen concentration: 0.5 wt %, solvent: $CDCl_3$). The presence of isoprene in the copolymer was confirmed in the $^1$H NMR spectrum, and the isoprene content was calculated by the equation below.

isoprene content (mol %)=(isoprene mole number in copolymer)/(isobutene mole number in copolymer)+(isoprene mole number in copolymer)

(3) Weight Average Molecular Weight and Molecular Weight Distribution

Measurement was conducted for the isobutene-isoprene copolymers under gel permeation chromatography (GPC) analysis conditions below, and a weight average molecular weight (Mw) and a number average molecular weight (Mn) were measured, and then, molecular weight distribution was calculated from the value of (weight average molecular weight)/(number average molecular weight).

Column: PL MiniMixed B×2
Solvent: THF
Flow rate: 0.3 ml/min
Specimen concentration: 2.0 mg/ml
Injection amount: 10 μL
Column temperature: 40° C.
Detector: Agilent RI detector
Standard: Polystyrene (corrected by a cubic function)
Data processing: ChemStation

TABLE 2

| | Yield (%) | Isoprene (mol %) | Weight average molecular weight (g/mol) | Molecular weight distribution |
|---|---|---|---|---|
| Example 1 | 37 | 1.40 | 695,000 | 1.9 |
| Example 2 | 48 | 1.61 | 622,000 | 2.2 |
| Example 3 | 35 | 1.43 | 442,000 | 2.3 |
| Example 4 | 35 | 1.85 | 460,000 | 2.4 |
| Example 5 | 16 | 1.48 | 605,000 | 2.2 |
| Comparative Example 1 | 34 | 1.27 | 350,000 | 2.1 |
| Comparative Example 2 | 34 | 1.39 | 338,000 | 1.9 |
| Comparative Example 3 | — | — | — | — |
| Comparative Example 4 | — | — | — | — |
| Comparative Example 5 | — | — | — | — |
| Comparative Example 6 | — | — | — | — |
| Comparative Example 7 | — | — | — | — |
| Comparative Example 8 | — | — | — | — |
| Comparative Example 9 | 90 | 1.21 | 93,000 | 6.4 |
| Comparative Example 10 | — | — | — | — |
| Comparative Example 11 | — | — | — | — |
| Comparative Example 12 | 10 | 1.39 | 22,000 | 7.7 |

In the cases of Comparative Examples 1 and 2, using the catalysts of Comparative Preparation Examples, which do not correspond to Formula 1, copolymers having markedly lower weight average molecular weights were prepared when compared to Example 1 which used the catalyst of Preparation Example 1 under the same conditions.

In addition, Comparative Examples 3 to 5, which used the catalysts of the Comparative Preparation Examples, and Comparative Examples 6 and 7, which used the catalyst of the present invention but did not use the cocatalyst, could not undergo the copolymerization reaction of isobutene and isoprene, and isobutene-isoprene copolymers could not be obtained.

In Comparative Examples 8 to 12, which used the catalyst of the present invention and cocatalysts not corresponding to Formula 2, it could be confirmed that isobutene-isoprene copolymers could be obtained only in Comparative Examples 9 and 12, and copolymers having lower weight average molecular weights and broad molecular weight distribution were prepared in both Comparative Examples 9 and 12 in contrast to the Examples.

As shown in the above results, it could be found that in case of using the catalyst represented by Formula 1 together with the cocatalyst represented by Formula 2 according to the present invention, an isobutene-isoprene copolymer with a high weight average molecular weight and narrow molecular weight distribution could be prepared in an excellent yield.

The invention claimed is:

1. A catalyst composition comprising a catalyst represented by the following Formula 1 and a cocatalyst represented by the following Formula 2:

[Formula 1]

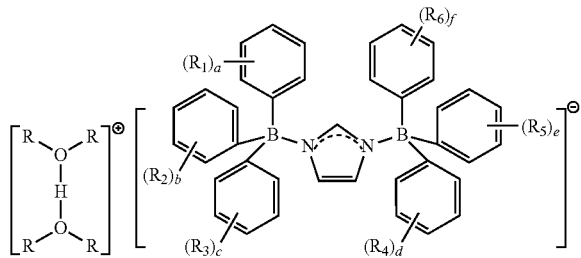

in Formula 1,
R is an alkyl group of 2 to 12 carbon atoms,
$R_1$ to $R_6$ are each independently a halogen group, and
a to f are each independently an integer of 1 to 5,

[Formula 2]

$(R_a)_n Al(X)_{3-n}$ in Formula 2,
$R_a$ is a hydrocarbon group of 1 to 20 carbon atoms,
X is a halogen group, and
n is an integer of 0 to 3.

2. The catalyst composition according to claim 1, wherein, in Formula 1,
R is an alkyl group of 2 to 8 carbon atoms,
$R_1$ to $R_6$ are each independently F or Cl, and
a to f are each independently an integer of 3 to 5.

3. The catalyst composition according to claim 1, wherein, in Formula 1,
R is an alkyl group of 2 to 6 carbon atoms,
$R_1$ to $R_6$ are F, and
a to f are each independently an integer of 4 or 5.

4. The catalyst composition according to claim 1, wherein the catalyst represented by Formula 1 is a compound represented by the following Formula 1-1 or Formula 1-2:

[Formula 1-1]

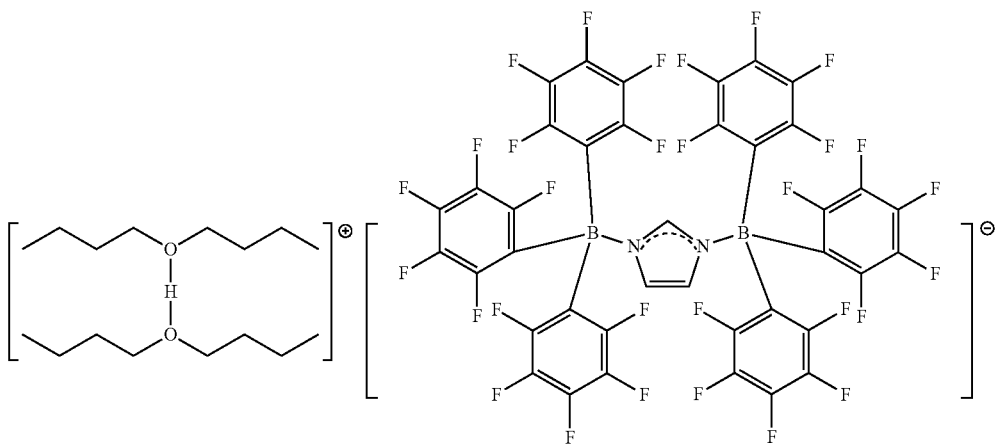

[Formula 1-2]

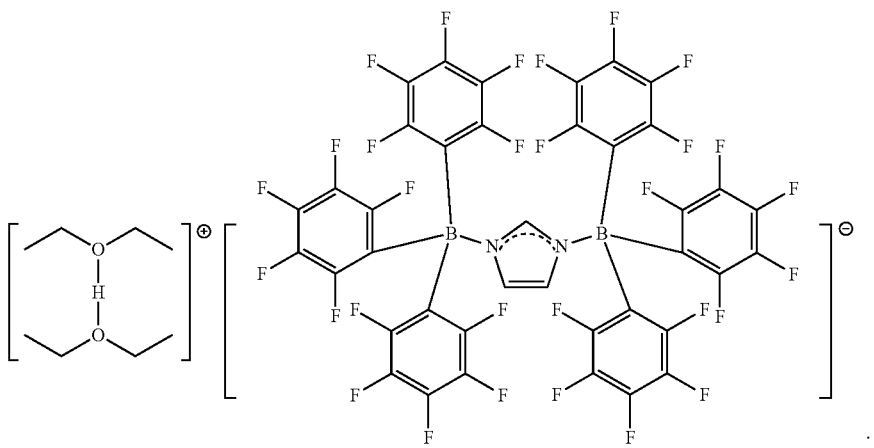

5. The catalyst composition according to claim 1, wherein, in Formula 2,
- $R_a$ is an alkyl group of 1 to 12 carbon atoms, a cycloalkyl group of 3 to 12 carbon atoms, or an aryl group of 6 to 12 carbon atoms,
- X is Cl or Br, and
- n is an integer of 1 to 3.

6. The catalyst composition according to claim 1, wherein, in Formula 2,
- $R_a$ is an alkyl group of 1 to 12 carbon atoms,
- X is Cl, and
- n is an integer of 2 or 3.

7. The catalyst composition according to claim 1, wherein a weight ratio of the catalyst represented by Formula 1 and the cocatalyst represented by Formula 2 is 1:2 to 1:16.

8. A method for preparing an isobutene-isoprene copolymer, the method comprising copolymerizing isobutene and isoprene in the presence of the catalyst composition according to claim 1.

9. The method for preparing an isobutene-isoprene copolymer according to claim 8, wherein the copolymerization is performed at a temperature of −50 to −10° C.

10. The method for preparing an isobutene-isoprene copolymer according to claim 8, wherein an amount of the catalyst represented by Formula 1 is 0.002 to 0.05 wt % based on a total weight of the isobutene and the isoprene.

11. The method for preparing an isobutene-isoprene copolymer according to claim 8, wherein an amount of the cocatalyst represented by Formula 2 is 0.05 to 0.4 wt % based a total weight of the isobutene and the isoprene.

12. A method for preparing an isobutene-isoprene copolymer, the method comprising copolymerizing isobutene and isoprene in the presence of the catalyst composition according to claim 4.

13. The method for preparing an isobutene-isoprene copolymer according to claim 8, wherein an amount of the isoprene is 1 mol % or more and 10 mol % or less based on the isobutene.

* * * * *